US010606310B1

(12) United States Patent
Chen et al.

(10) Patent No.: US 10,606,310 B1
(45) Date of Patent: Mar. 31, 2020

(54) ELECTRONIC DEVICE

(71) Applicant: Acer Incorporated, New Taipei (TW)

(72) Inventors: Hung-Chi Chen, New Taipei (TW);
Wen-Chieh Tai, New Taipei (TW);
Shun-Bin Chen, New Taipei (TW);
Huei-Ting Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/402,245

(22) Filed: May 3, 2019

(30) Foreign Application Priority Data

Nov. 27, 2018 (TW) .............................. 107142287 A

(51) Int. Cl.
*G06F 1/16* (2006.01)
*G06F 3/02* (2006.01)

(52) U.S. Cl.
CPC .......... *G06F 1/1624* (2013.01); *G06F 1/1616* (2013.01); *G06F 1/1667* (2013.01); *G06F 1/1675* (2013.01); *G06F 3/0221* (2013.01)

(58) Field of Classification Search
CPC combination set(s) only.
See application file for complete search history.

(56) References Cited

U.S. PATENT DOCUMENTS

| 5,287,245 A * | 2/1994 | Lucente | G06F 1/1616 292/163 |
| 5,534,891 A * | 7/1996 | Takano | G06F 1/1616 345/169 |
| 5,539,615 A * | 7/1996 | Sellers | B41J 11/56 361/679.12 |
| 5,613,786 A * | 3/1997 | Howell | G06F 1/1616 400/472 |
| 5,629,832 A * | 5/1997 | Sellers | B41J 11/56 361/679.11 |
| 5,706,167 A * | 1/1998 | Lee | G06F 1/1664 361/679.55 |
| 5,717,431 A * | 2/1998 | Chia-Ying | G06F 1/1616 345/168 |
| 5,729,480 A * | 3/1998 | Katoh | G06F 1/1616 708/142 |

(Continued)

FOREIGN PATENT DOCUMENTS

| CN | 103179827 | 12/2015 |
| TW | M328225 | 3/2008 |

*Primary Examiner* — Lisa Lea-Edmonds
(74) *Attorney, Agent, or Firm* — JCIPRNET

(57) ABSTRACT

An electronic device including a body, an input module, and an engaging mechanism is provided. The input module is movably disposed at the body and adapted to move along an axial direction. The engaging mechanism includes a first engaging portion and a second engaging portion. The first engaging portion is connected to the input module. The second engaging portion is movably connected to the body. When the axial direction has a first angle with respect to a direction of gravity, the second engaging portion is away from the first engaging portion so that the input module is adapted to move along the axial direction. When the axial direction has a second angle with respect to the direction of gravity, the second engaging portion is engaged with the first engaging portion to limit the movement of the input module in the axial direction, and the first angle is greater than the second angle.

10 Claims, 6 Drawing Sheets

(56) References Cited

U.S. PATENT DOCUMENTS

| | | | | |
|---|---|---|---|---|
| 5,742,475 | A * | 4/1998 | Riddiford | G06F 1/1616 16/291 |
| 5,754,395 | A * | 5/1998 | Hsu | G06F 1/1616 361/679.11 |
| 5,764,474 | A * | 6/1998 | Youens | G06F 1/1616 345/169 |
| 5,818,360 | A * | 10/1998 | Chu | G06F 1/1616 341/22 |
| 5,838,263 | A * | 11/1998 | Chang | G06F 1/1616 341/22 |
| 6,028,768 | A * | 2/2000 | Cipolla | G06F 1/1616 361/679.12 |
| 6,055,153 | A * | 4/2000 | Chiu | G06F 1/1616 361/679.09 |
| 6,175,492 | B1 * | 1/2001 | Nobuchi | G06F 1/1616 361/679.08 |
| 6,304,431 | B1 * | 10/2001 | Kim | G06F 1/1616 361/679.09 |
| 6,762,931 | B2 * | 7/2004 | Chen | G06F 1/1616 292/163 |
| 6,768,635 | B2 * | 7/2004 | Lai | G06F 1/1616 248/351 |
| 6,771,493 | B2 * | 8/2004 | Chen | G06F 1/1616 292/95 |
| 6,853,543 | B1 * | 2/2005 | Moore | G06F 1/1667 361/679.12 |
| 6,870,730 | B2 * | 3/2005 | Riddiford | G06F 1/1616 248/917 |
| 7,342,776 | B1 * | 3/2008 | Chan | G06F 1/1616 345/169 |
| 7,355,843 | B2 * | 4/2008 | Riddiford | G06F 1/1616 345/905 |
| 7,594,772 | B2 * | 9/2009 | Chen | G06F 3/0221 400/472 |
| 7,894,184 | B2 * | 2/2011 | Huang | G06F 1/1616 361/679.11 |
| 8,050,017 | B2 * | 11/2011 | Riddiford | G06F 1/1616 345/905 |
| 8,542,486 | B2 * | 9/2013 | Lin | G06F 1/203 174/547 |
| 8,773,353 | B2 * | 7/2014 | Wei | G06F 1/1662 345/156 |
| 9,104,374 | B2 * | 8/2015 | Tsai | G06F 1/1616 |
| 9,317,070 | B2 * | 4/2016 | Linegar | G06F 1/1664 |
| 9,491,888 | B2 * | 11/2016 | Wei | G06F 1/1662 |
| 9,501,097 | B2 * | 11/2016 | Moser | G06F 1/1616 |
| 9,501,156 | B2 * | 11/2016 | Linegar | G06F 1/1664 |
| 2002/0126441 | A1 * | 9/2002 | Kuo | G06F 1/1616 361/679.09 |
| 2008/0285215 | A1 * | 11/2008 | Kim | G06F 1/1616 361/679.23 |
| 2009/0273893 | A1 * | 11/2009 | Wilson | G06F 1/1616 361/679.12 |
| 2010/0165567 | A1 * | 7/2010 | Shih | G06F 1/1616 361/679.48 |
| 2010/0245250 | A1 * | 9/2010 | Linegar | G06F 1/1664 345/168 |
| 2013/0069878 | A1 * | 3/2013 | Li | G06F 1/1616 345/168 |
| 2014/0071607 | A1 * | 3/2014 | Frinak | G06F 1/1624 361/679.09 |
| 2018/0343760 | A1 * | 11/2018 | Lee | G06F 1/1626 |
| 2019/0208662 | A1 * | 7/2019 | Lee | G06F 1/1624 |

\* cited by examiner

ELECTRONIC DEVICE

CROSS-REFERENCE TO RELATED APPLICATION

This application claims the priority benefit of Taiwan application serial no. 107142287, filed on Nov. 27, 2018. The entirety of the above-mentioned patent application is hereby incorporated by reference herein and made a part of this specification.

BACKGROUND OF THE INVENTION

Field of the Invention

The invention is related to an electronic device, and more particularly, to an electronic device that helps to improve convenience and comfort during use.

Description of Related Art

With the advancement of technology, electronic devices have entered daily life from the early industrial use. The notebook computer is one of the common electronic devices in current life. It has the advantages of good performance, small size, and portability. It allows the user to process various files such as images, pictures, sounds, texts, etc., and may also help the user send and receive messages, download/upload data, watch videos, or listen to music, etc.

In response to market demand, various notebook computer vendors have developed esports notebooks, and the design of esports notebooks focuses on the convenience and comfort of playing games, wherein the keyboard is touched and used by every user when using the notebook. How to improve the convenience and comfort of the user when using the keyboard is an important subject for esports notebook computers.

SUMMARY OF THE INVENTION

The invention provides an electronic device that helps to improve convenience and comfort during use.

An electronic device of the invention includes a body, an input module, and an engaging mechanism. The input module is movably disposed at the body and adapted to move along an axial direction. The engaging mechanism includes a first engaging portion and a second engaging portion. The first engaging portion is connected to the input module. The second engaging portion is movably connected to the body. When the axial direction has a first angle with respect to a direction of gravity, the second engaging portion is away from the first engaging portion so that the input module is adapted to move along the axial direction. When the axial direction has a second angle with respect to the direction of gravity, the second engaging portion is engaged with the first engaging portion to limit the movement of the input module in the axial direction, and the first angle is greater than the second angle.

In an embodiment of the invention, the first angle is between 21 degrees and 90 degrees, and the second angle is between 0 degrees and 20 degrees.

In an embodiment of the invention, the engaging mechanism includes a rotating member and a counterweight. The rotating member is pivoted to the body and includes the second engaging portion. The counterweight is disposed at the rotating member and configured to move the second engaging portion toward the direction of gravity.

In an embodiment of the invention, the rotating member has an arc portion, and the arc portion and the second engaging portion are respectively located at two opposite ends of the counterweight.

In an embodiment of the invention, the rotating member has a rotating end and an engaging end opposite to each other, the rotating end is pivoted to the body, and the engaging end has the second engaging portion.

In an embodiment of the invention, a weight of the counterweight is greater than a weight of the rotating member.

In an embodiment of the invention, a material of the rotating member includes a plastic, and a material of the counterweight includes a metal.

In an embodiment of the invention, materials of the rotating member and the counterweight include a plastic.

In an embodiment of the invention, materials of the rotating member and the counterweight include a metal.

In an embodiment of the invention, the electronic device further includes a limiting member connected to the body, and the limiting member is configured to limit the movement itinerary of the second engaging portion.

In an embodiment of the invention, the input module includes a keyboard area and a touch area. The keyboard area is slidably connected to the body. The touch area is rotatably connected to the keyboard area.

Based on the above, in the electronic device of the invention, when the axial direction has a first angle with respect to the direction of gravity, the second engaging portion is away from the first engaging portion, so that the input module is in a free state and is adapted to move along the axial direction. The user may move the position of the input module on the body according to their own needs. When the axial direction has a second angle with respect to the direction of gravity, the second engaging portion is engaged with the first engaging portion to limit the movement of the input module in the axial direction, thereby limiting the position of the input module on the body, and the first angle is greater than the second angle. Accordingly, the user may adjust the position of the input module on the body according to their own needs, or limit the position of the input module on the body, which helps to improve the convenience and comfort of the electronic device during use.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
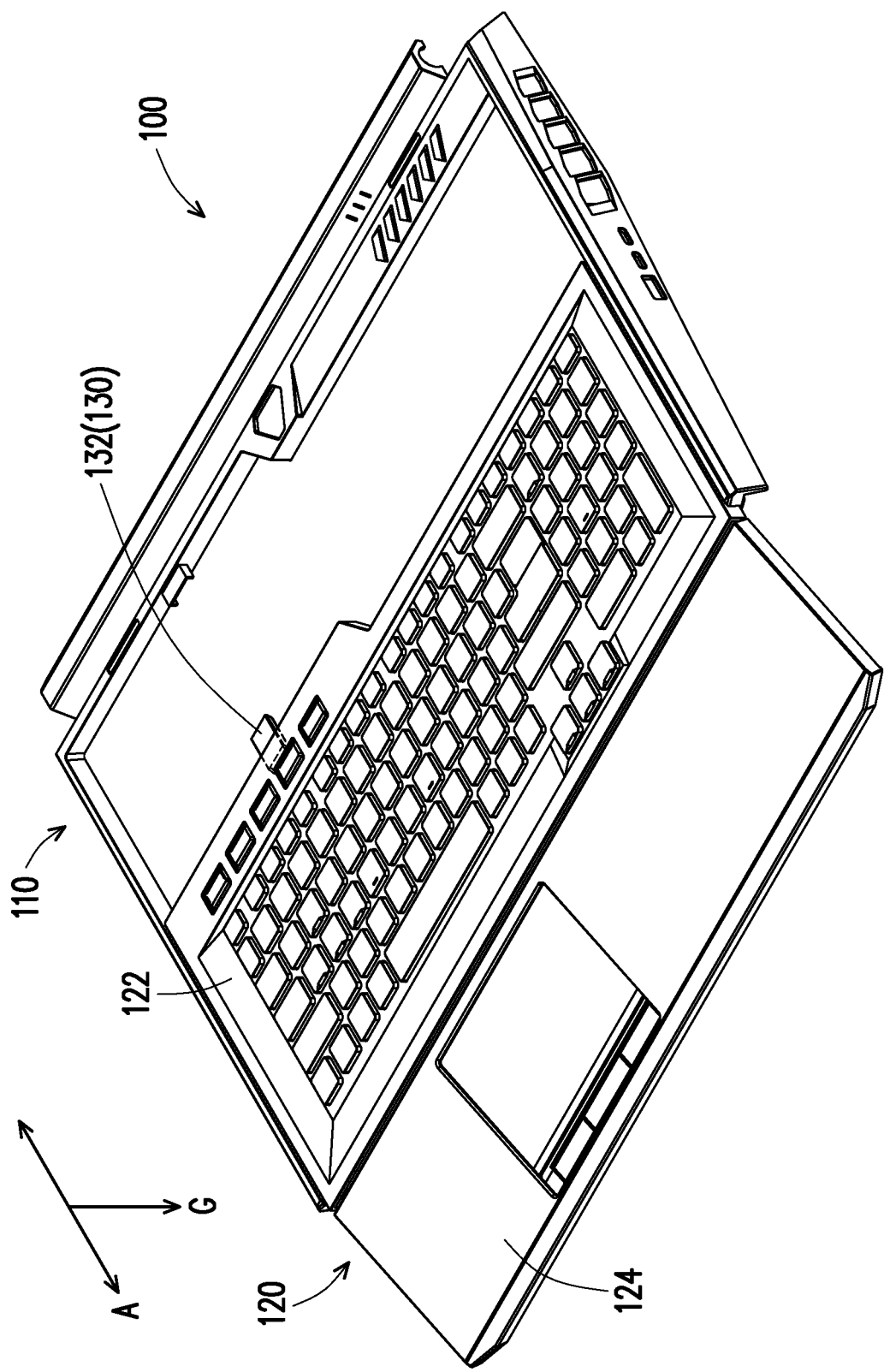
FIG. 1 is a perspective view of an electronic device of an embodiment of the invention.
Figure 2:
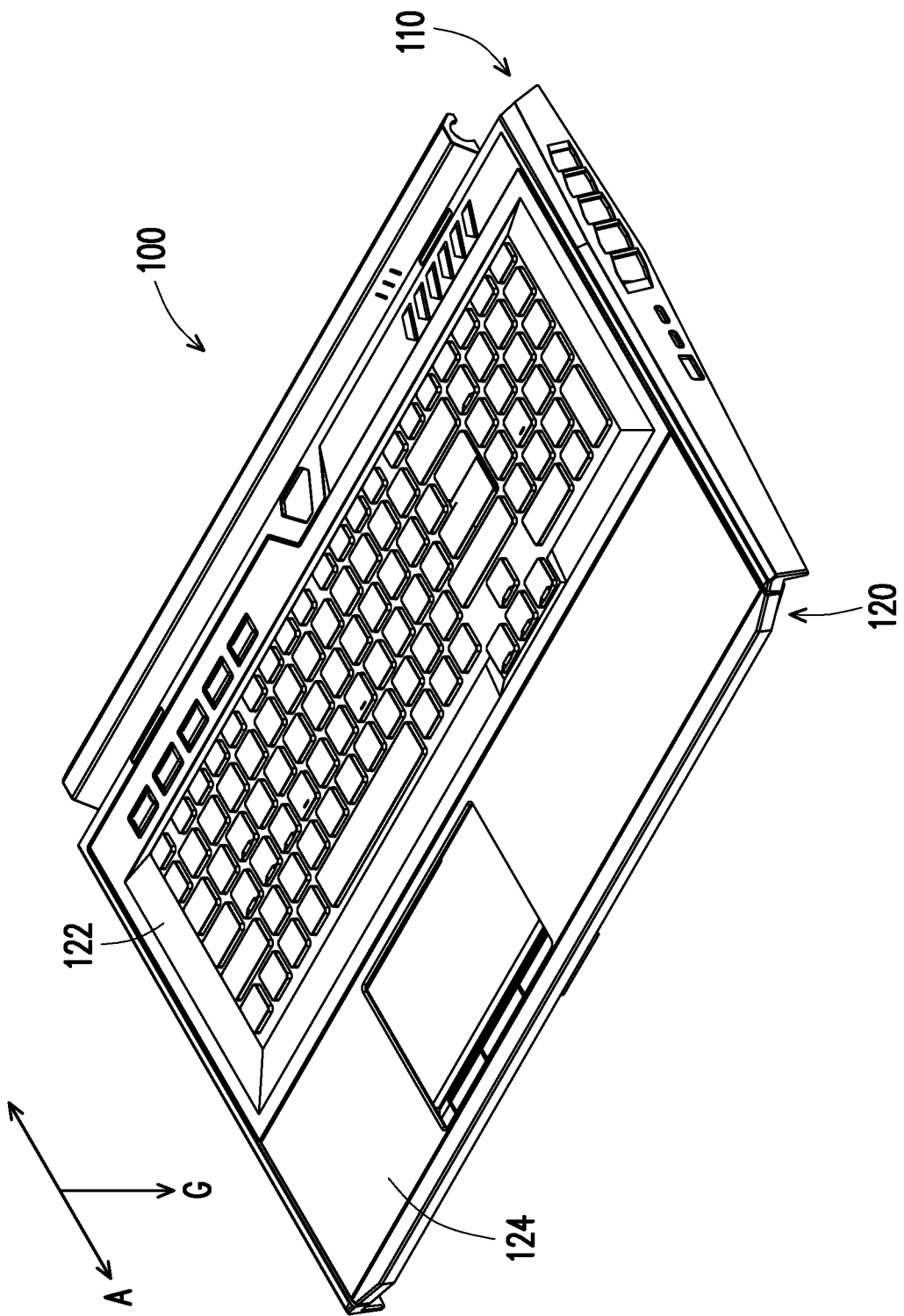
FIG. 2 is a perspective view of the input module of FIG. 1 folded into the body.
Figure 3:
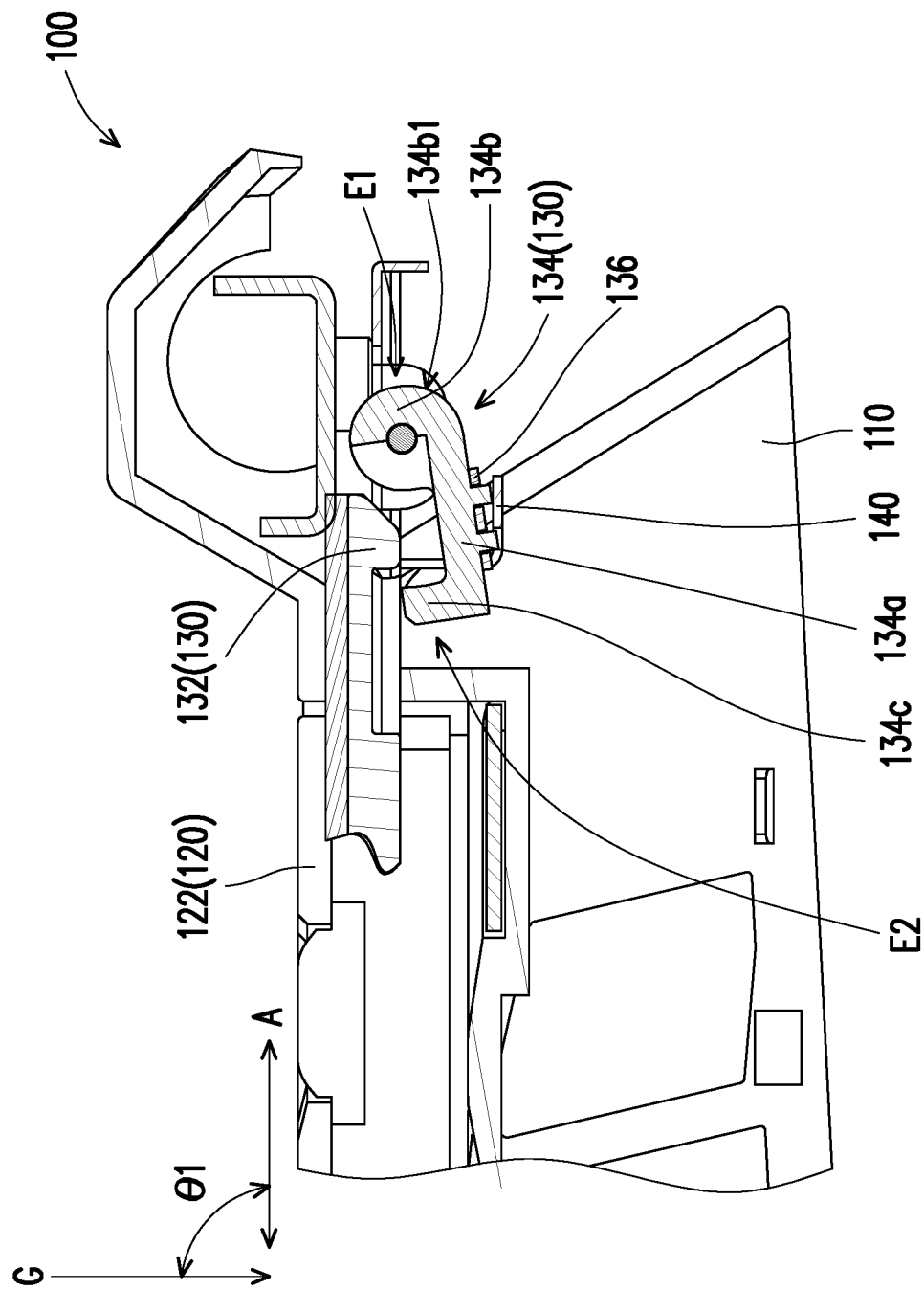
FIG. 3 is a partial cross-sectional view of the electronic device of FIG. 2.

FIG. 1 is a perspective view of an electronic device of an embodiment of the invention. FIG. 2 is a perspective view of the input module of FIG. 1 folded into the body. FIG. 3 is a partial cross-sectional view of the electronic device of FIG. 2. To make the figures concise, only the upper case of a body 110 is shown in FIG. 1, FIG. 2, and FIG. 3. Referring to FIG. 1, FIG. 2, and FIG. 3, the electronic device 100 of the present embodiment includes a body 110, an input module 120, and an engaging mechanism 130. The body 110 may be a system end of the notebook computer, but is not limited thereto, and the body 110 may be pivoted to another corresponding body, such as a display screen with or without touch function. The input module 120 includes a keyboard area 122 and a touch area 124. The keyboard area 122 is, for example, one end of a notebook computer provided with a button, and the touch area 124 is, for example, one end of the notebook computer provided with a touch panel. The input module 120 is movably disposed at the body 110 and is adapted to move along an axial direction A. The axial direction A is, for example, parallel to the extending direction of the surface of the keyboard area 122. The engaging mechanism 130 includes a first engaging portion 132 and a second engaging portion 134c. The first engaging portion 132 is connected to the input module 120, and the second engaging portion 134c is movably connected to the body 110. When the axial direction A has a first angle θ1 with respect to a direction of gravity G, the second engaging portion 134c is away from the first engaging portion 132, so that the input module 120 is in a free state and may reciprocate along the axial direction A. In the present embodiment, the first angle θ1 is, for example, between 21 degrees and 90 degrees, but is not limited thereto.

As shown in FIG. 1, when the user needs to perform an input operation on the electronic device 100 via the keyboard area 122, the keyboard area 122 may be pushed to move toward the direction of the touch area 124 along the axial direction A, so that the keyboard area 122 may be moved near the user, and the touch area 124 may be rotated to be abutted against a plane (not shown, the plane is, for example, a table top) to provide a place for the user to bear the hand when performing an input operation on the keyboard area 122. Accordingly, the user may move the position of the input module 120 on the body 110 according to their own needs, which helps to improve the convenience and comfort of the electronic device 100 during use.

In the present embodiment, the engaging mechanism 130 includes a rotating member 134 and a counterweight 136. The rotating member 134 is pivoted to the body 110 and includes the second engaging portion 134c. The counterweight 136 is disposed at the rotating member 134 and configured to move the second engaging portion 134c toward the direction of gravity G.

In detail, the rotating member 134 further includes a main body 134a and a pivoting portion 134b. The second engaging portion 134c is connected to one of the ends of the main body 134a, and the pivoting portion 134b is connected to the other end of the main body 134a. In other words, the main body 134a is located between the second engaging portion 134c and the pivoting portion 134b, and the rotating member 134 is pivoted to the body 110 via the pivoting portion 134b.

In the present embodiment, the pivoting portion 134b forms a rotating end E1, the second engaging portion 134c and the main body 134a form an engaging end E2, and the counterweight 136 is disposed at the main body 134a of the rotating member 134 so that the weight of the engaging end E2 of the rotating member 134 is greater than the weight of the rotating end E1, so that the rotating member 134 may be rotated toward the direction of gravity G. In other embodiments, the counterweight 136 may also be disposed at the second engaging portion 134c or disposed at both the second engaging portion 134c and the main body 134a.

In the present embodiment, the material of the rotating member 134 includes plastic, and the material of the counterweight 136 includes metal such that the weight of the counterweight 136 may be greater than the weight of the plastic, so that the rotating member 134 can be rotated toward the direction of gravity G. In the present embodiment, the material of the rotating member 134 is plastic and the material of the counterweight 136 is metal. Such material arrangement may shorten the length of the main body 134a of the rotating member 134 (or shorten the distance between the second engaging portion 134c and the pivoting portion 134b), and the weight of the engaging end E2 of the rotating member 134 may still be greater than the weight of the rotating end E1 of the rotating member 134, so that the effect of making the rotating member 134 face the direction of gravity G may still be achieved even when the rotating member 134 has a smaller volume. As a result, the internal space of the electronic device 100 occupied by the rotating member 134 may be reduced, thus facilitating the effective use of the internal space of the electronic device 100, and therefore the electronic device 100 may be more lightweight and compact. The counterweight 136 may be fixed to the rotating member 134 via, for example, an engaging method, but in other embodiments, the counterweight may also be fixed to the rotating member 134 via a bonding method.

In addition, in other embodiments, the material of the rotating member and the material of the counterweight may include plastic, or the material of the rotating member and the material of the counterweight may include metal, and the material of the rotating member and the counterweight is not limited herein and is determined based on the needs.

In the present embodiment, the rotating member 134 may include an arc portion 134b1 at the pivoting portion 134b, and the design of the arc portion 134b1 may effectively reduce the volume of the pivoting portion 134b, so that the weight of the rotating end of the rotating member 134 may be reduced, which helps to shorten the length of the main body 134a of the rotating member 134 (or shorten the distance between the second engaging portion 134c and the pivoting portion 134b), which facilitates the effective use of the internal space of the electronic device 100, and therefore the electronic device 100 may be more lightweight and compact.

In the present embodiment, the electronic device 100 further includes a limiting member 140. The limiting member 140 is connected to the body 110. When the axial direction A has a first angle θ1 with respect to the direction of gravity G, the limiting member 140 may be used to block the rotation itinerary of the rotating member 134 toward the direction of gravity G. The available space inside the electronic device 100 may be increased by limiting the rotation itinerary of the rotating member 134, which facilitates the effective use of the internal space of the electronic device 100, and therefore the electronic device 100 may be more lightweight and compact.

Figure 4:
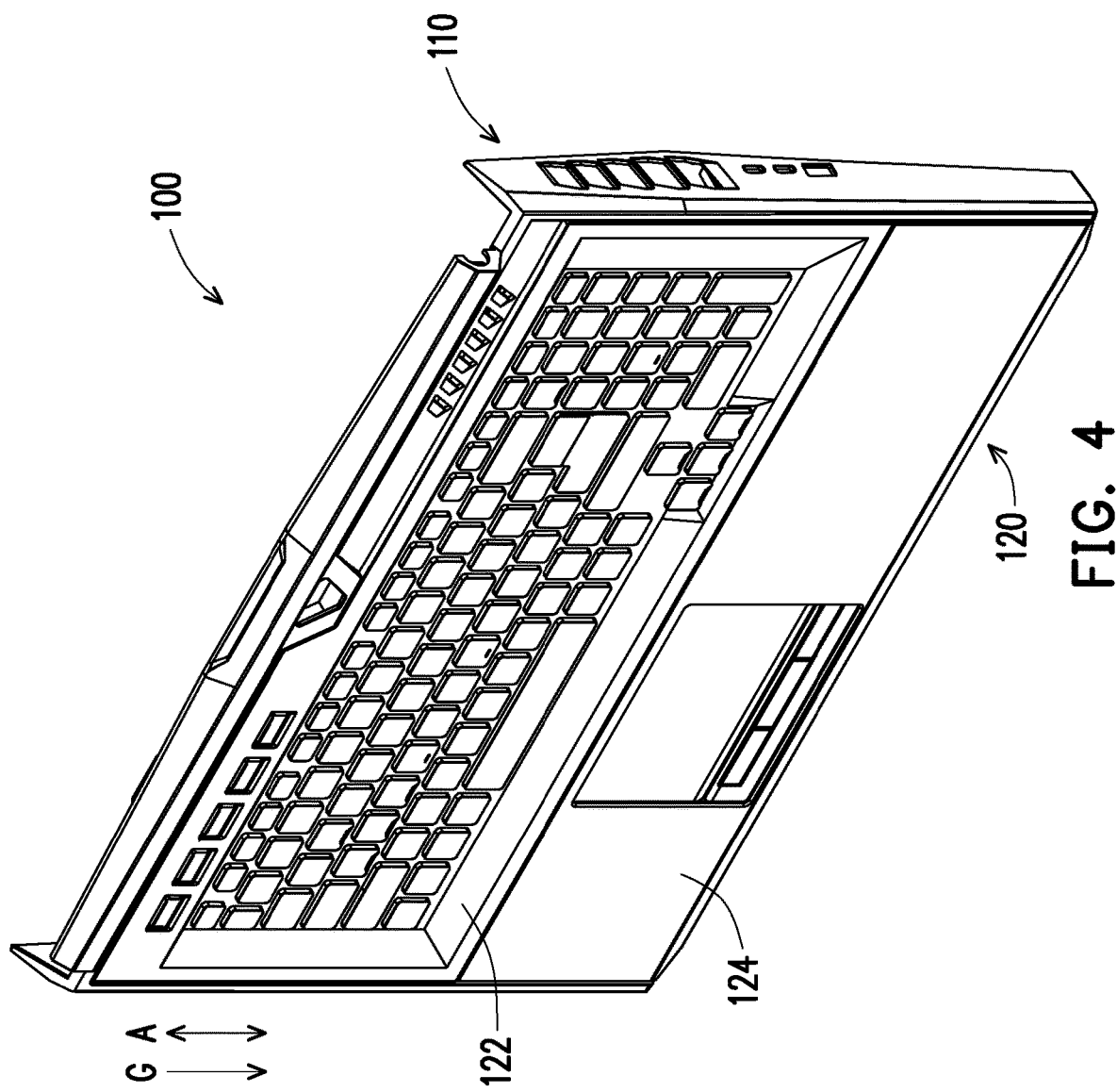
FIG. 4 is a perspective view of the electronic device of FIG. 1 for which the axial direction has a second angle with respect to the direction of gravity.
Figure 5:
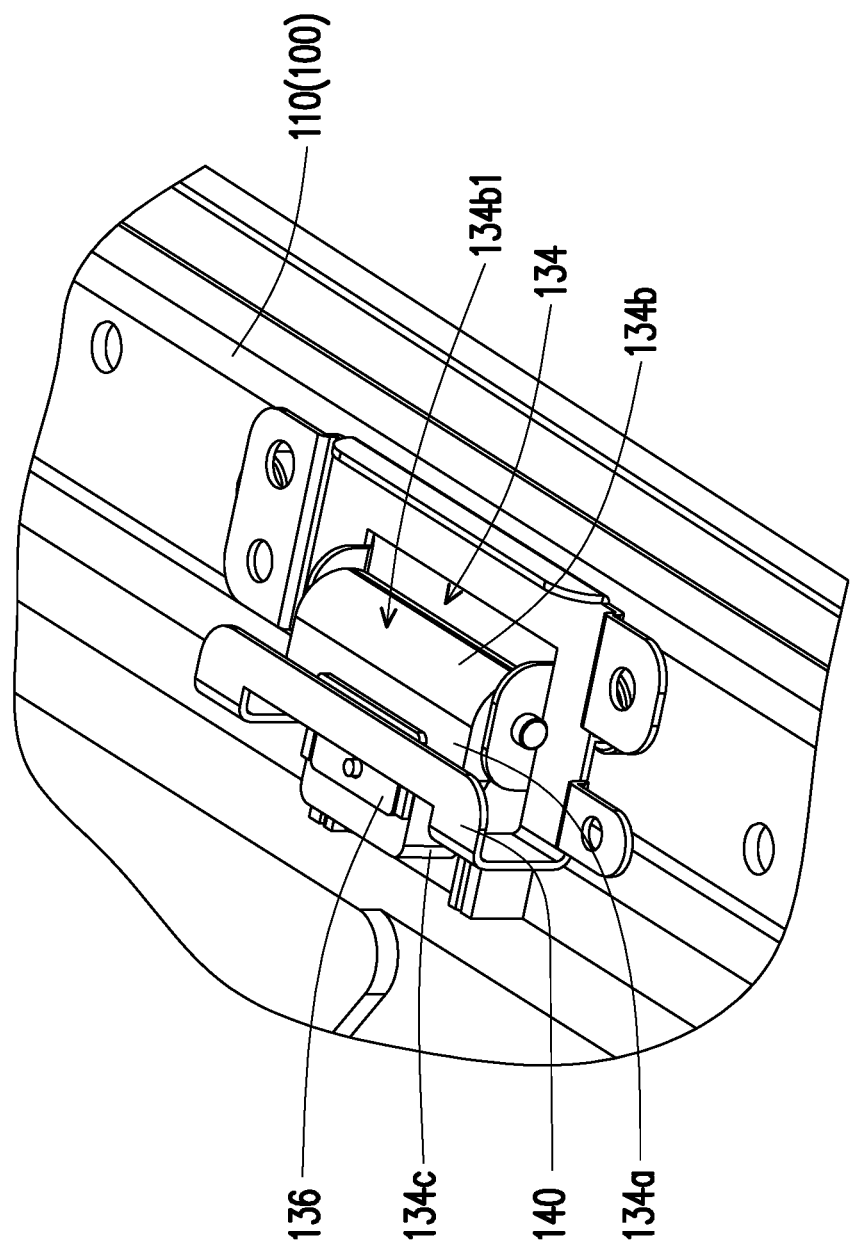
FIG. 5 is a perspective view of the electronic device of FIG. 4 from another angle.
Figure 6:
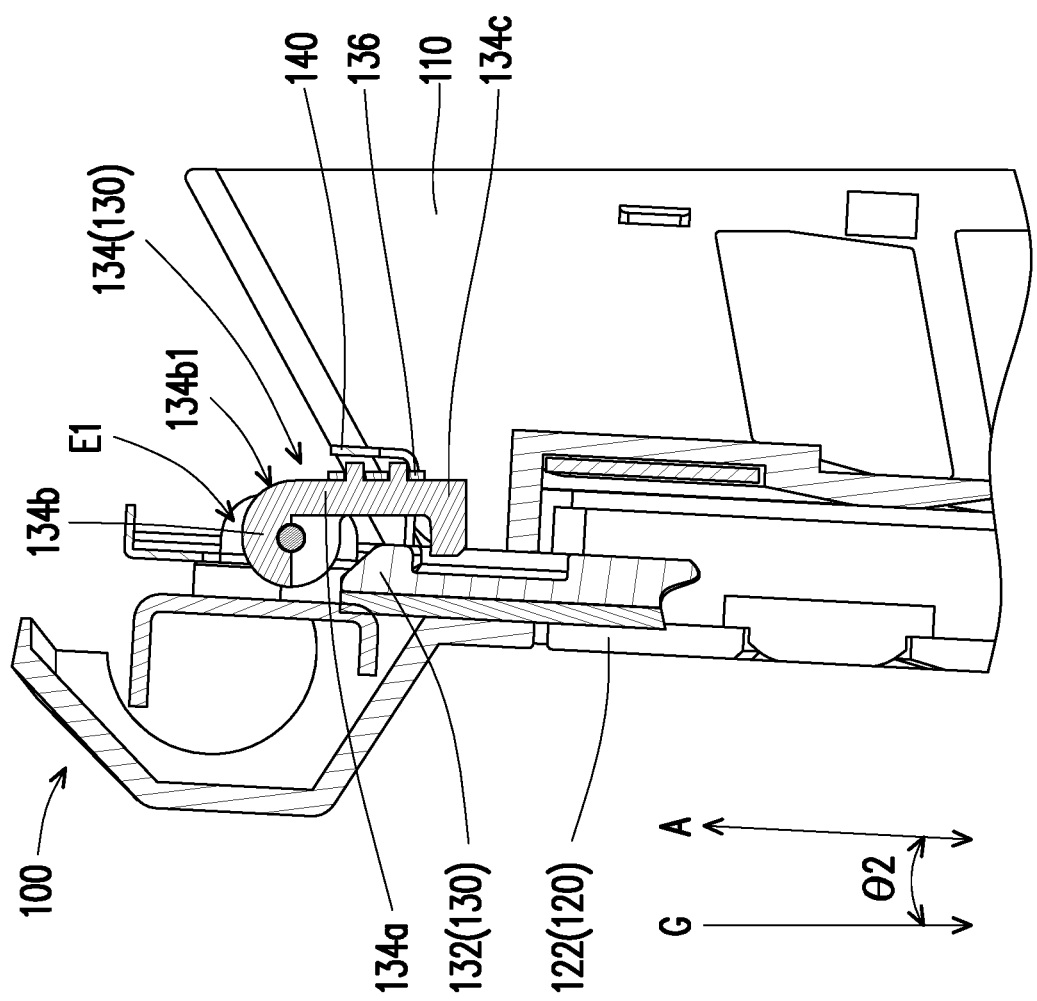
FIG. 6 is a partial cross-sectional view of the electronic device of FIG. 3 for which the axial direction has a second angle with respect to the direction of gravity.

FIG. 4 is a perspective view of the electronic device of FIG. 1 for which the axial direction has a second angle with respect to the direction of gravity. FIG. 5 is a perspective view of the electronic device of FIG. 4 from another angle. FIG. 6 is a partial cross-sectional view of the electronic device of FIG. 3 for which the axial direction has a second angle with respect to the direction of gravity. To make the figures concise, only the upper case of the body 110 is shown in FIG. 4, FIG. 5, and FIG. 6. Referring to FIG. 4, FIG. 5, and FIG. 6, when the user does not need to use the electronic device 100, the input module 120 may be first folded into the body 110 as shown in FIG. 2. When the user needs to carry the electronic device 100 to move, the electronic device 100 may be converted from the angle shown in FIG. 2 to the angle of FIG. 4, that is, the angle between the axial direction A and the direction of gravity G is reduced and the first angle $\theta 1$ is changed to the second angle $\theta 2$, and the second angle $\theta 2$ is, for example, between 0 degrees and 20 degrees (or the electronic device 100 is turned by 70 degrees to 90 degrees), but is not limited thereto. When the axial direction A has a second angle $\theta 2$ with respect to the direction of gravity G, the rotating member 134 is subjected to the effect of gravity, and the second engaging portion 134c is rotated toward the direction in which the input module 120 is located, so that the second engaging portion 134c is engaged with the first engaging portion 132 such that the input module 120 is limited by the second engaging portion 134c and is not moved toward the direction of gravity G by the influence of gravity in the axial direction A. Accordingly, the second engaging portion 134c may be automatically rotated to a position that limits the movement of the input module 120 in the axial direction A, so that the user may carry the electronic device 100 to move, which helps to improve the convenience of the electronic device 100 in use.

In the present embodiment, the second engaging portion 134c may be engaged with the first engaging portion 132 first after the electronic device 100 is rotated by a certain angle. For example, when the electronic device 100 is rotated by 70 degrees (i.e., the axial direction A is 20 degrees from the direction of gravity G), the second engaging portion 134c may be engaged with the first engaging portion 132, so as to further ensure that the input module 120 is not moved toward the direction of gravity G along the axial direction A by the influence of gravity, which may improve the reliability of the electronic device 100 in use.

In summary, in the electronic device of the present embodiment, when the axial direction has a first angle with respect to a direction of gravity, the second engaging portion is away from the first engaging portion, so that the input module is in a free state and may reciprocate along the axial direction, and the user may move the position of the input module on the body according to their own needs, which helps to improve the convenience and comfort of the electronic device during use. When the axial direction has a second angle with respect to the direction of gravity, the rotating member is subjected to the effect of gravity, and the second engaging portion is rotated toward the direction in which the input module is located, so that the second engaging portion is engaged with the first engaging portion, so that the input module is limited by the second engaging portion and is not moved toward the direction of gravity by the influence of gravity in the axial direction, and the second engaging portion may be automatically rotated to a position that limits the movement of the input module in the axial direction, which is convenient for the user to carry the electronic device to move, thus helping to improve the convenience of the electronic device in use.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electronic device, comprising:
    a body;
    an input module movably disposed at the body and adapted to move along an axial direction; and
    an engaging mechanism, comprising:
        a first engaging portion connected to the input module;
        a second engaging portion movably connected to the body;
        a rotating member pivoted to the body and comprising the second engaging portion; and
        a counterweight disposed at the rotating member and configured to move the second engaging portion toward the direction of gravity,
    wherein the second engaging portion is away from the first engaging portion when the axial direction has a first angle with respect to a direction of gravity so that the input module is adapted to move along the axial direction, the second engaging portion is engaged with the first engaging portion when the axial direction has a second angle with respect to the direction of gravity to limit a movement of the input module in the axial direction, and the first angle is greater than the second angle.

2. The electronic device of claim 1, wherein the first angle is between 21 degrees and 90 degrees, and the second angle is between 0 degrees and 20 degrees.

3. The electronic device of claim 1, wherein the rotating member has an arc portion, and the arc portion and the second engaging portion are respectively located at two opposite ends of the counterweight.

4. The electronic device of claim 1, wherein the rotating member has a rotating end and an engaging end opposite to each other, the rotating end is pivoted to the body, and the engaging end has the second engaging portion.

5. The electronic device of claim 1, wherein a weight of the counterweight is greater than a weight of the rotating member.

6. The electronic device of claim 1, wherein a material of the rotating member comprises a plastic, and a material of the counterweight comprises a metal.

7. The electronic device of claim 1, wherein materials of the rotating member and the counterweight comprise a plastic.

8. The electronic device of claim 1, wherein materials of the rotating member and the counterweight comprise a metal.

9. The electronic device of claim 1, further comprising:
    a limiting member connected to the body, and the limiting member is configured to limit a movement itinerary of the second engaging portion.

10. The electronic device of claim 1, wherein the input module comprises:
    a keyboard area slidably connected to the body; and
    a touch area rotatably connected to the keyboard area.

* * * * *